United States Patent
Segev et al.

(10) Patent No.: US 9,543,831 B2
(45) Date of Patent: Jan. 10, 2017

(54) CONFIGURABLE DC-DC CONVERTER

(71) Applicant: Marvell International Ltd., Hamilton (BM)

(72) Inventors: Eran Segev, Tel Aviv (IL); Shimeon Greenberg, Yavne (IL)

(73) Assignee: MARVELL INTERNATIONAL LTD., Hamilton (BM)

( * ) Notice: Subject to any disclaimer, the term of this patent is extended or adjusted under 35 U.S.C. 154(b) by 280 days.

(21) Appl. No.: 14/184,732

(22) Filed: Feb. 20, 2014

(65) Prior Publication Data

US 2014/0235301 A1    Aug. 21, 2014

Related U.S. Application Data

(60) Provisional application No. 61/767,372, filed on Feb. 21, 2013.

(51) Int. Cl.
*H02M 3/156* (2006.01)
*H02M 3/00* (2006.01)
*H04W 52/02* (2009.01)

(52) U.S. Cl.
CPC .............. *H02M 3/156* (2013.01); *H02M 3/00* (2013.01); *H04W 52/0261* (2013.01); *H04W 52/0267* (2013.01)

(58) Field of Classification Search
CPC ..... H02M 3/00; H02M 3/156; H04W 52/0261
USPC .......................................... 323/318; 455/574
See application file for complete search history.

(56) References Cited

U.S. PATENT DOCUMENTS

| | | | |
|---|---|---|---|
| 6,263,192 B1* | 7/2001 | Alderton | H02M 3/156 455/557 |
| 2007/0216714 A1* | 9/2007 | Sato | B41J 2/0458 347/5 |
| 2008/0220826 A1* | 9/2008 | Dagher | H04W 52/52 455/572 |
| 2009/0326624 A1* | 12/2009 | Melse | G11C 5/145 607/116 |
| 2012/0286576 A1* | 11/2012 | Jing | H02M 3/156 307/43 |

FOREIGN PATENT DOCUMENTS

KR    WO 2011025296 A2 *    3/2011    ............ H04N 5/63

* cited by examiner

*Primary Examiner* — Jessica Han
*Assistant Examiner* — Bart Iliya

(57) ABSTRACT

A method includes, in a mobile communication terminal that is powered by a DC-DC converter and is operated by a user in accordance with multiple possible usage scenarios, predefining for each of the possible usage scenarios a repective set of one or more parameters of operation for the DC-DC converter. When the user operates the terminal in accordance with a given usage scenario from among the possible usage scenarios, the predefined set of parameters of operation corresponding to the given usage scenario is selected, without physically sensing an electrical current drawn by the DC-DC converter. The DC-DC converter is configured to supply electrical power to the terminal using the selected parameters of operation.

16 Claims, 1 Drawing Sheet

CONFIGURABLE DC-DC CONVERTER

CROSS-REFERENCE TO RELATED APPLICATIONS

This application claims the benefit of U.S. Provisional Patent Application 61/767,372, filed Feb. 21, 2013, whose disclosure is incorporated herein by reference.

FIELD OF THE DISCLOSURE

The present disclosure relates generally to electrical power supplies, and particularly to configurable DC-DC converters.

BACKGROUND

Power supplies of mobile communication terminals, such as cellular phones, typically comprise a DC-DC converter that converts the battery voltage into one or more regulated operating voltages. Various DC-DC conversion schemes are known in the art, such as Pulse-Width Modulation (PWM) and Pulse-Frequency Modulation (PFM).

The description above is presented as a general overview of related art in this field and should not be construed as an admission that any of the information it contains constitutes prior art against the present patent application.

SUMMARY

An embodiment that is described herein provides a method including, in a mobile communication terminal that is powered by a DC-DC converter and is operated by a user in accordance with multiple possible usage scenarios, determining a usage scenario according to which the terminal currently operates. One or more parameters of operation for the DC-DC converter are derived from the usage scenario. The DC-DC converter is configured to supply electrical power to the terminal using the derived parameters of operation.

In some embodiments, deriving the parameters of operation includes predicting, based on the usage scenario, an expected consumption of current to be supplied from the DC-DC converter, and selecting the parameters of operation based on the expected consumption. In some embodiments, the method includes storing a respective predefined setting of the parameters of operation for ones of a plurality of the possible usage scenarios, and deriving the parameters of operation includes selecting the setting that corresponds to the selected usage scenario.

In various embodiments, configuring the DC-DC converter includes modifying a maximum current drive of a solid-state switch in the DC-DC converter, modifying a switching frequency of the DC-DC converter, modifying a switching pulse-width of the DC-DC converter, modifying a load threshold for transitioning between a Pulse Width Modulation (PWM) mode and a Pulse Frequency Modulation (PFM) mode in the DC-DC converter, and/or at least partially disabling circuitry in the DC-DC converter.

There is additionally provided, in accordance with an embodiment that is described herein, and apparatus including a DC-DC converter and control circuitry. The control circuitry is configured to determine, from among multiple possible usage scenarios, a usage scenario in which the apparatus currently operates, to derive from the usage scenario one or more parameters of operation for the DC-DC converter, and to configure the DC-DC converter to supply electrical power using the derived parameters of operation.

In some embodiments, the control circuitry includes a usage scenario detection unit configured to determine the usage scenario in which the apparatus currently operates, and a control unit configured to configure the DC-DC converter. In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Embodiments that are described herein provide methods and systems for adaptively controlling DC-DC converters in mobile communication terminals. In some disclosed embodiments, control circuitry in the terminal determines the present usage scenario of the terminal, and uses this information to adapt one or more parameters of operation of the DC-DC converter. As a result, the performance (e.g., efficiency) of the DC-DC converter is optimized for the specific conditions imposed by the present usage scenario.

In different embodiments, the control circuitry recognizes various usage scenarios, e.g., whether the terminal is idle, engaged in a voice call, displaying video or running navigation software, to name just a few examples. Various parameters of operation of the DC-DC converter can be adapted to match the present usage scenario, e.g., the maximum current drive, Pulse-Width Modulation (PWM) pulse-width, Pulse-Frequency Modulation (PFM) frequency, or the transition threshold between PWM and PFM, among others.

The disclosed techniques maintain the DC-DC converter operating at high efficiency, notwithstanding the significant changes in load conditions caused by varying usage scenarios. As a result, the average current consumption of the mobile communication terminal is reduced, and battery life is extended. The disclosed techniques go far beyond merely adapting the DC-DC converter parameters to match varying load conditions—In the embodiments described herein, the DC-DC operation is optimized per the present or expected usage scenario.

The disclosed techniques anticipate the load conditions based on usage scenario, and do not rely on physical sensing of electrical current that may incur efficiency losses. Moreover, the disclosed techniques are able to predict the future expected load conditions, not only estimate the present load conditions. The prediction enables the control circuitry to prepare the DC-DC converter in advance to accommodate changes in load conditions, and thus react quickly and efficiently to subsequent load changes.

Figure 1:
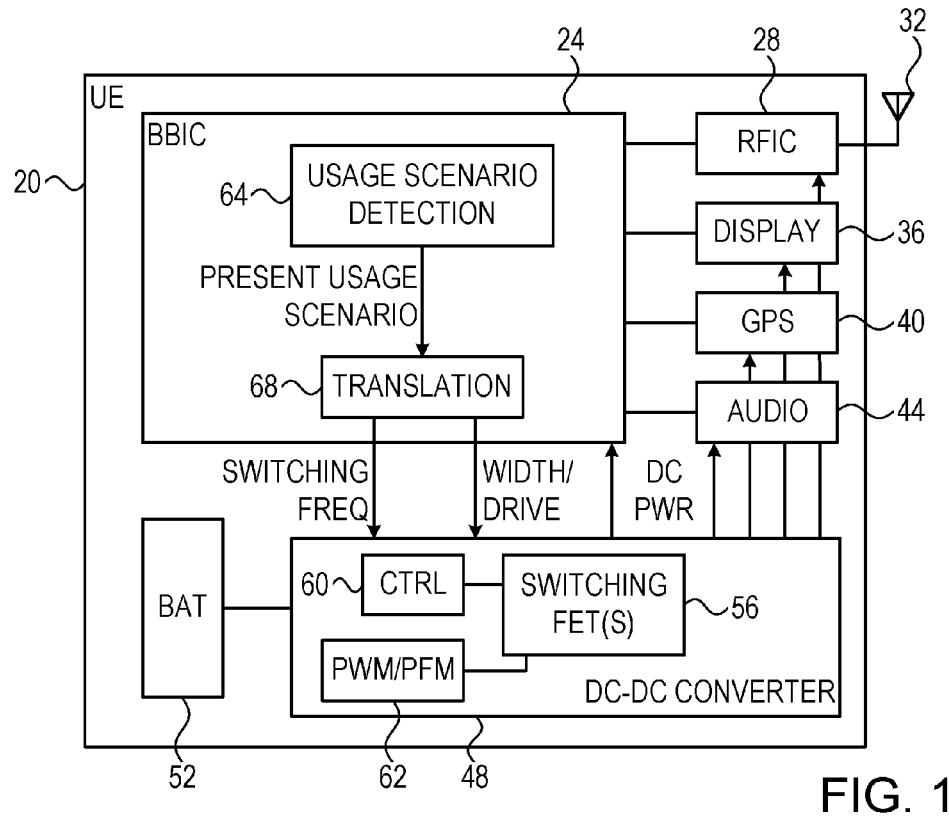
FIG. 1 is a block diagram that schematically illustrates a mobile communication terminal, in accordance with an embodiment that is described herein.

FIG. 1 is a block diagram that schematically illustrates a mobile communication terminal 20, in accordance with an embodiment that is described herein. In various embodiments terminal 20 comprises, for example, a cellular phone, a smartphone, a mobile or tablet computer, a Personal digital Assistant (PDA), a cellular modem (e.g., in an automotive system), or any other suitable kind of communication terminal.

Terminal 20 may operate in accordance with various communication standards and protocols, such as Global System for Telecommunication (GSM), Universal Mobile Telecommunications System (UMTS), Long Term Evolution (LTE), LTE-Advanced (LTE-A), various Wireless Local Area Network (WLAN) protocols, or any other suitable communication protocol. Depending on the applicable protocol, terminal 20 is also referred to as Mobile Station (MS), User Equipment (UE) or station (STA).

In the present example, terminal 20 comprises a Baseband Integrated Circuit (BBIC) 24 and a Radio Frequency Integrated Circuit (RFIC) 28. BBIC 24 carries out the various baseband signal processing and digital processing tasks of the terminal. RFIC 28 carries out the various analog tasks of transmission and reception, including, for example, cellular and/or Wi-Fi communication. An antenna 32 transmits and receives RF signals to and from one or more base stations (not shown in the figure). In some embodiments, terminal 20 further comprises additional components such as a display unit (e.g., touch screen) 36, a Global Positioning System (GPS) unit 40 and an audio unit 44.

In the embodiment of FIG. 1, terminal 20 comprises a battery 52 that provides electrical power to the various terminal components. A DC-DC converter 48 converts the Direct Current (DC) voltage of battery 52 into one or more DC regulated operating voltages. The operating voltages are supplied to the different terminal components, e.g., BBIC 24, RFIC 28, display unit 36, GPS unit 40 and audio unit 44.

In an example embodiment, battery 52 supplies a voltage in the range of 3.6V-4.2V depending on the battery charge level. The desired operating voltages produced by DC-DC converter 48 comprise, for example, 1.8V, 1.2V. 1.1V and/or 3V. The total current drawn from battery 52 varies considerably with usage scenario, e.g., between 2 mA and 3 A. These numerical values are given solely by way of example. In alternative embodiments, any other suitable values can be used.

In various embodiments, DC-DC converter 48 may be implemented using any suitable voltage conversion scheme, such as buck, boost, buck/boost or charge-pump scheme. Typically, DC-DC converter 48 comprises a suitable high-current solid-state switch that carries out voltage switching, e.g., using PWM or PFM. In the example of FIG. 1 the solid-state switch comprises one or more switching Field-Effect Transistors (FETs) 56. Alternatively, however, any other suitable solid-state switches can be used instead of or in addition to switching FETs 56. A control unit 60 controls FETs 56 and the DC-DC converter in general. In the example of FIG. 1, DC-DC converter 48 comprises a PWM/PFM module 62 that operates the DC-DC converter either in PWM mode or in PFM mode, as instructed by control unit 60.

In embodiments that are described herein, control circuitry in terminal 20 adapts one or more parameters of operation of DC-DC converter 48 depending on the present usage scenario of the terminal. Adapted parameters may comprise, for example, the switching frequency, the current threshold for transitioning between PWM and PFM, enabling or disabling of converter circuitry, or setting of converter modes. These adaptive control schemes are described in greater detail below.

In the present example, BBIC 24 comprises a usage scenario detection unit 64, which determines the present usage scenario of the terminal, e.g., whether the terminal is idle, engaged in a voice call, navigating, playing video or browsing. Usage scenarios of this sort differ from one another considerably in current consumption from the various supply voltages, e.g., because they differ in computational complexity and/or because they activate different hardware elements.

A translation unit 68 translates the present usage scenario into suitable parameters of operation for DC-DC converter 48, and instructs control unit 60 to set these parameters of operation. In an example embodiment, translation unit 68 comprises a Look-Up Table (LUT) that stores a respective predefined set of parameters for various different usage scenarios. Alternatively, any other translation method can be used.

The configuration of terminal 20 shown in FIG. 1 is an example configuration, which is depicted solely for the sake of clarity. In alternative embodiments, any other suitable terminal configuration can be used. For example, in the present example, the control circuitry that carries out the disclosed techniques comprises usage detection unit 64, translation unit 68 and control unit 60. Alternatively, the functional partitioning among the various terminal components can be defined in any other suitable way. For example, some or all of the functions of the control circuitry can be implemented in a separate Power Management Integrated Circuit (PMIC).

Some terminal elements that are not mandatory for understanding of the disclosed techniques have been omitted from the figures for the sake of clarity. The different elements of terminal 20 are typically implemented using dedicated hardware, such as implementing BBIC 24 and RFIC 28 using one or more Application-Specific Integrated Circuits (ASICs), Radio frequency Integrated Circuits (RFIC) and/or Field-Programmable Gate Arrays (FPGAs). Alternatively, some terminal elements (e.g., control unit 60 and/or parts of BBIC 24) may be implemented using software executing on programmable hardware, or using a combination of hardware and software elements.

When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory. In some embodiments, some elements of terminal 20 may be fabricated in a chip-set.

Typically, terminal 20 is capable of operating under various usage scenarios. The term "usage scenario" refers to the way the terminal is operated by its user, and the processing tasks the terminal carries out during operation. An example, non-limiting list of usage scenarios comprises Hi-Fi playback of audio, video decoding and playback, voice call, data download, Internet browsing, and navigation using GPS. A state in which the terminal is idle is also considered a usage scenario. Additionally and alternatively, any other suitable usage scenario can be considered.

Each usage scenario imposes certain load conditions (i.e., current consumption from the various operating voltages) on DC-DC converter 48, and the load conditions often differ considerably from one usage scenario to another. Different usage scenarios may differ in current consumption, for example, because of differences in clock frequency in BBIC 24 (computationally-intensive scenarios use higher clock frequencies that draw more current), because of activation or deactivation of components (e.g., GPS unit 40), because they use different type of communication (e.g., transmission vs. reception or different transmission/reception ratios), because they use different display or audio levels, or for any other reason.

For example, GPS navigation and video playback typically impose a heavy current load on the DC-DC converter, whereas an idle usage scenario requires very low current. Voice calls typically incur intermediate load. Browsing usage scenarios typically vary between intermediate and heavy current load, depending, for example, on the content of the browsed Web pages.

Load conditions typically have a strong impact on the performance of DC-DC converter 48, and in particular on the conversion efficiency. Moreover, parameters of operation that provide optimal efficiency change as a function of the load. Thus, in some embodiments terminal 20 adapts the parameters of operation of DC-DC converter 48 based on the present usage scenario.

Figure 2:
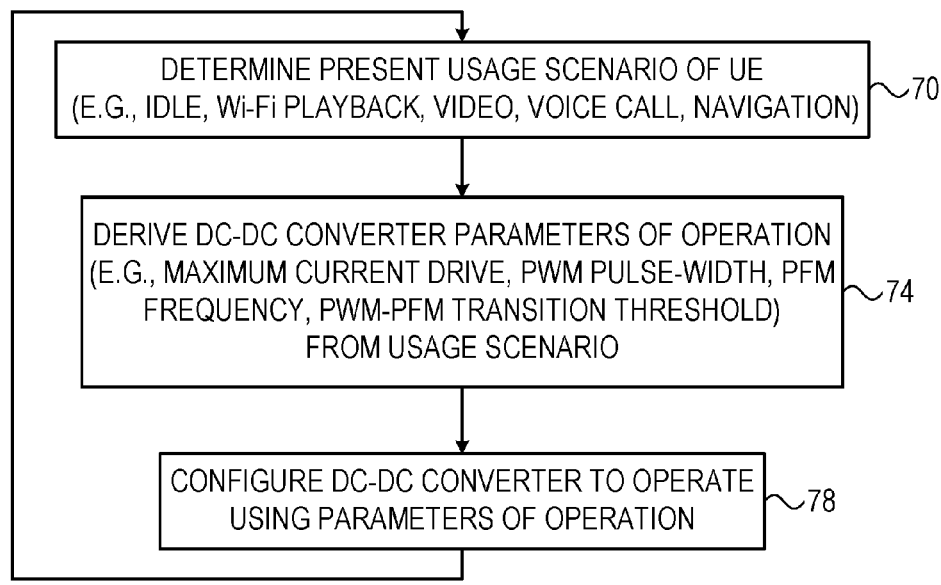
FIG. 2 is a flow chart that schematically illustrates a method for operating a DC-DC converter in a mobile communication terminal, in accordance with an embodiment that is described herein.

FIG. 2 is a flow chart that schematically illustrates a method for operating DC-DC converter 48 in mobile communication terminal 20, in accordance with an embodiment that is described herein. The method begins with usage scenario detection unit 64 determining the present usage scenario of terminal 20, at a scenario determination operation 70. In various embodiments, unit 64 is able to distinguish among any suitable usage scenarios, such as the scenarios listed above.

At a parameter derivation operation 74, translation unit 68 derives one or more parameters of operation for DC-DC converter 48 from the present usage scenario. Any suitable group of parameters can be derived. An example, non-limiting list of parameters comprises the switching frequency used for modulating FETs 56, the current threshold in which the DC-DC converter transitions between PWM and PFM operation, enabling or disabling of converter circuitry (e.g., detection circuits, driver of FETs 56, current limiting circuits), and/or setting of converter modes (e.g., low-noise mode, low-ripple mode, 100% duty-cycle mode, sleep mode, and/or high/low voltage accuracy mode).

In some embodiments, translation unit 68 stores multiple predefined sets of parameters corresponding to the respective usage scenarios. Upon receiving a notification of the present usage scenario from unit 64, translation unit 68 notifies control unit in DC-DC converter 48 of the appropriate set of parameters. Translation unit 68 and control unit 60 may communicate using any suitable interface, such as, for example, Inter-Integrated Circuit (I$^2$C), System Power Management Interface (SPMI), Synchronous Serial Port (SSP) or General-Purpose Input/Output (GPIO) interface.

At a converter reconfiguration operation 78, control unit 60 configures the DC-DC converter to operate in accordance with the requested set of parameters. As a result, the parameters of operation of the DC-DC converters are adapted to match the actual load conditions dictated by the present usage scenario. In some embodiments, the adaptation is continuous, while in other embodiments adaptation is performed at predetermined time intervals or in response to predetermined events or system states.

In one example embodiment, the adapted parameter of operation comprises the maximum current drive capability of DC-DC converter 48. When the usage scenario imposes low current consumption, the maximum current drive is set to a low value in order to reduce energy loss. When the usage scenario imposes high current, the maximum current drive is set to a high value in order to meet the current demand.

In an embodiment, DC-DC converter 48 comprises multiple switching FETs 56 that are arranged in parallel. In this embodiment, control unit 60 changes the maximum current drive capability of the DC-DC converter by increasing or decreasing the number of active FETs, e.g., by activating or deactivating individual FETs as needed. In another embodiment, DC-DC converter 48 comprises a single FET 56 having a configurable-width active area. By modifying the active area of the FET, unit 60 changes the maximum current drive capability of the DC-DC converter. Further alternatively, unit 60 may modify maximum current drive capability of the DC-DC converter in any other suitable way.

In some embodiments, the control circuitry adapts a set of multiple parameters depending on usage scenario. In an example embodiment, when detecting a high-current usage scenario, the control circuitry increases the maximum current drive capability of the DC-DC converter, increases the current limit, and also increases the PWM-PFM transition threshold. When detecting a low-current usage scenario, the control circuitry decreases these three parameters of operation.

In another embodiment, when detecting a low-power usage scenario (e.g., idle or power-save), the control circuitry deactivates certain circuits in the DC-DC converter in order to reduce current consumption. Deactivated circuits may comprise, for example, clock reference circuits, PWM-PFM threshold detection circuits, current limit circuits, and/or any other suitable circuits.

In yet another example embodiment, the control circuitry sets the switching frequency of DC-DC converter 48 so as to provide maximum efficiency for the most probable average load current imposed by the present usage scenario. The optimal switching frequencies for various usage scenarios are typically computed in advance.

Although the embodiments described herein mainly address mobile communication devices, the methods and systems described herein can also be used in other applications, such as in any mobile platform or power-sensitive platform having a dynamically changing usage profile.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:
1. A method, comprising:
in a mobile communication terminal, which is powered by a DC-DC converter and is operated by a user in accordance with multiple possible usage scenarios, predefining for each of the usage scenarios a respective set of one or more parameters of operation for the DC-DC converter;
when the user operates the terminal in accordance with a given usage scenario from among the possible usage scenarios, selecting the predefined set of parameters of operation corresponding to the given usage scenario, without physically sensing an electrical current drawn by the DC-DC converter; and configuring the DC-DC converter to supply DC electrical power to the terminal using the selected parameters of operation.

2. The method according to claim 1, wherein selecting the predefined set comprises predicting, based on the usage scenario, an expected consumption of current to be supplied from the DC-DC converter, and selecting the predefined set of parameters of operation based on the expected consumption.

3. The method according to claim 1, wherein configuring the DC-DC converter comprises modifying a maximum current drive of a solid-state switch in the DC-DC converter.

4. The method according to claim 1, wherein configuring the DC-DC converter comprises modifying a switching frequency of the DC-DC converter.

5. The method according to claim 1, wherein configuring the DC-DC converter comprises modifying a switching pulse-width of the DC-DC converter.

6. The method according to claim 1, wherein configuring the DC-DC converter comprises modifying a threshold current at which the DC-DC converter transitions between a Pulse Width Modulation (PWM) mode and a Pulse Frequency Modulation (PFM) mode.

7. The method according to claim 1, wherein configuring the DC-DC converter comprises at least partially disabling circuitry in the DC-DC converter.

8. Apparatus, comprising:
a DC-DC converter; and
control circuitry, which is configured to store a respective predefined set of one or more parameters of operation for the DC-DC converter for each of multiple possible usage scenarios, to select from among the possible usage scenarios, when a user operates the terminal in accordance with a given usage scenario, the predefined set of parameters of operation corresponding to the given usage scenario, without physically sensing an electrical current drawn by the DC-DC converter and to configure the DC-DC converter to supply DC electrical power using the selected parameters of operation.

9. The apparatus according to claim 8, wherein the control circuitry comprises a usage scenario detection unit configured to determine the given usage scenario in which the apparatus currently operates, and a control unit configured to configure the DC-DC converter.

10. The apparatus according to claim 8, wherein the control circuitry is configured to configure the DC-DC converter by modifying a maximum current drive of a solid-state switch in the DC-DC converter.

11. The apparatus according to claim 8, wherein the control circuitry is configured to configure the DC-DC converter by modifying a switching frequency of the DC-DC converter.

12. The apparatus according to claim 8, wherein the control circuitry is configured to configure the DC-DC converter by modifying a switching pulse-width of the DC-DC converter.

13. The apparatus according to claim 8, wherein the control circuitry is configured to configure the DC-DC converter by modifying a threshold current at which the DC-DC converter transitions between a Pulse Width Modulation (PWM) mode and a Pulse Frequency Modulation (PFM) mode.

14. The apparatus according to claim 8, wherein the control circuitry is configured to configure the DC-DC converter by at least partially disabling circuitry in the DC-DC converter.

15. A mobile communication terminal comprising the apparatus of claim 8.

16. A chipset for processing signals in a mobile communication terminal, comprising the apparatus of claim 8.

* * * * *